United States Patent [19]
Yianilos et al.

[11] Patent Number: 5,321,609
[45] Date of Patent: Jun. 14, 1994

[54] ELECTRONIC ENCYCLOPEDIA

[75] Inventors: Peter N. Yianilos, Princeton, N.J.; Joseph E. Decker, San Jose, Calif.; Rafael Mayer, Philadelphia, Pa.

[73] Assignee: Franklin Electronic Publishers, Incorporated, Mt. Holly, N.J.

[21] Appl. No.: 889,180

[22] Filed: May 27, 1992

[51] Int. Cl.$^5$ ............................................. G06F 15/38
[52] U.S. Cl. ...................... 364/419.13; 364/419.07; 364/419.19; 395/600
[58] Field of Search .............. 364/419, 419.03, 419.07, 364/419.13, 419.19; 395/600

[56] References Cited

U.S. PATENT DOCUMENTS 4,868,733 9/1989 Fujisawa et al. ..................... 364/200

Primary Examiner—Roy N. Envall, Jr.
Assistant Examiner—Ari M. Bai
Attorney, Agent, or Firm—McAulay Fisher Nissen Goldberg & Kiel

[57] ABSTRACT

A location technique in an electronic encyclopedia for presenting relevant articles in response to a user input of a query term. The technique employs a user controlled hierarchy of filter parameters. The user selects a subset of the identifying parameters into which all articles are classified; each article being classified into at least one identifying parameter. There are 107 parameters disclosed. The encyclopedia automatically locates each article that employs the input or query term in each of the parameters selected by the user.

The 107 identifying parameters are divided into four Groups. The articles presented to the user are only those articles which are common to each of tex up to four Groups into which the user selected parameters are divided.

An optimally useful set of articles is provided to the user. By a combination of the union of the articles within the user selected parameters within each of the Groups together with the intersection of the articles between Groups.

10 Claims, 2 Drawing Sheets

ELECTRONIC ENCYCLOPEDIA

BACKGROUND OF THE INVENTION

This invention relates in general to an electronic encyclopedia and more particularly to improved techniques for presenting relevant information and relevant articles to the user.

It is known to provide large quantities of information on ROM chips for presentation to a user on a viewing screen where the user controls selection of material presented means of a data entry keyboard. There are known techniques for rapid scanning or searching of the data base against an entry word or term or set of words. By means of this scanning technique, a large number of separate entries or articles can be identified as having a term that matches the input or query term. These articles can be presented in sequence to the user so that the user can determine which of the articles is of greatest relevance to the user's inquiry or interest.

However, an encyclopedia has such an enormous data base that for many query terms, the number of articles identified are too numerous to permit the user to conveniently scan subject matter of greatest interest. What is required to make an electronic encyclopedia of optimum usefulness is to provide a technique under the user's control for determining the scope or depth of the search.

There is a great wealth of information relevant to any particular inquiry that a user might be making. That wealth of information is spread throughout an encyclopedia in many articles. What is needed is a way to organize a search through the material to provide a comprehensive yet efficient means for locating the information of greatest interest to the user.

Accordingly, a major purpose of this invention is to provide a technique for organizing the information available in an encyclopedia in response to a user input query in such a fashion that the user can efficiently focus on the information most likely to be of greatest pertinence to the user's reason for making the inquiry.

BRIEF DESCRIPTION

In brief, this invention relates to a technique for accessing articles in an encyclopedia in terms of significance and relevance to the user's interest. The embodiment described employs a ROM memory in which all of the articles in the encyclopedia are kept. A keyboard and screen are used in a known fashion to permit the user to input a word or term or set of words that identify a subject matter where a known search procedure is undertaken to identify for presentation on the screen all articles in the encyclopedia which refer to the entered term. The articles so identified include those which employ the entered term, but do not necessarily have the entered term as part of the heading of the article. Accordingly, in many cases, a very large number of articles will be identified by the search routine. For some entries, hundreds of articles might be identified out of the nearly 10,000 articles in the encyclopedia. This provides a formidable selection test for the user.

Accordingly, in accordance with this invention each article is classified within at least one, and generally a number of, categories. In one embodiment, there are 107 such categories and they are referred to herein as filter parameters because the selection of any one of the categories by the user serves to select the articles classified in that category for presentation. For example, if the entry word is "country", 581 articles can be identified from an extended search in one embodiment. If the filter parameter "Americas" is selected by the user the number of articles is reduced to 150. And, as described herein, the number can be further reduced by the selection of certain other filter parameters.

In order to enable a useful selection of relevant articles, these filter parameters are set forth in four Groups, namely, "Article Type", "Location", "Subject", and "Time Period."

The logic of the selection process is such that when a user picks a first filter parameter in one of those four Groups and a second filter parameter in the same Group, the set of articles selected will be the sum of the set of articles classified in each of those two filter parameters (that is, the union of the two sets).

However, when a user selects a filter parameter from a first Group and a filter parameter from a second Group, the articles selected will be only those articles which are common to the two filter parameters (the intersection of the two sets).

Multiple filter parameters within a Group can be selected and multiple Groups can be selected.

Thus by appropriate selection of Groups and of categories or filter parameters within each Group, a user is provided with an efficient mechanism for expanding or narrowing the number of relevant articles that the user wishes to review.

It is important to keep in mind that the more filter parameters selected by a user in any one of these four Groups, the greater will be the number of articles selected for presentation. However, the more a user can select filter parameters from separate Groups, the fewer will the number of articles selected for presentation.

In a preferred embodiment, the over one-hundred filter parameter categories are somewhat cumbersome to employ when divided into four Groups. Accordingly, a hierarchical arrangement of filter parameters is provided wherein a generic parameter is selected by the user only if the user is interested in going to one of the specific filter parameter within that generic parameter. For example, one generic parameter under the Group "Location" is "Western Europe". That generic parameter subsumes seven specie parameters including "British Isles", "France", "Germany", etc.

DESCRIPTION OF THE PREFERRED EMBODIMENTS

Figure 1:
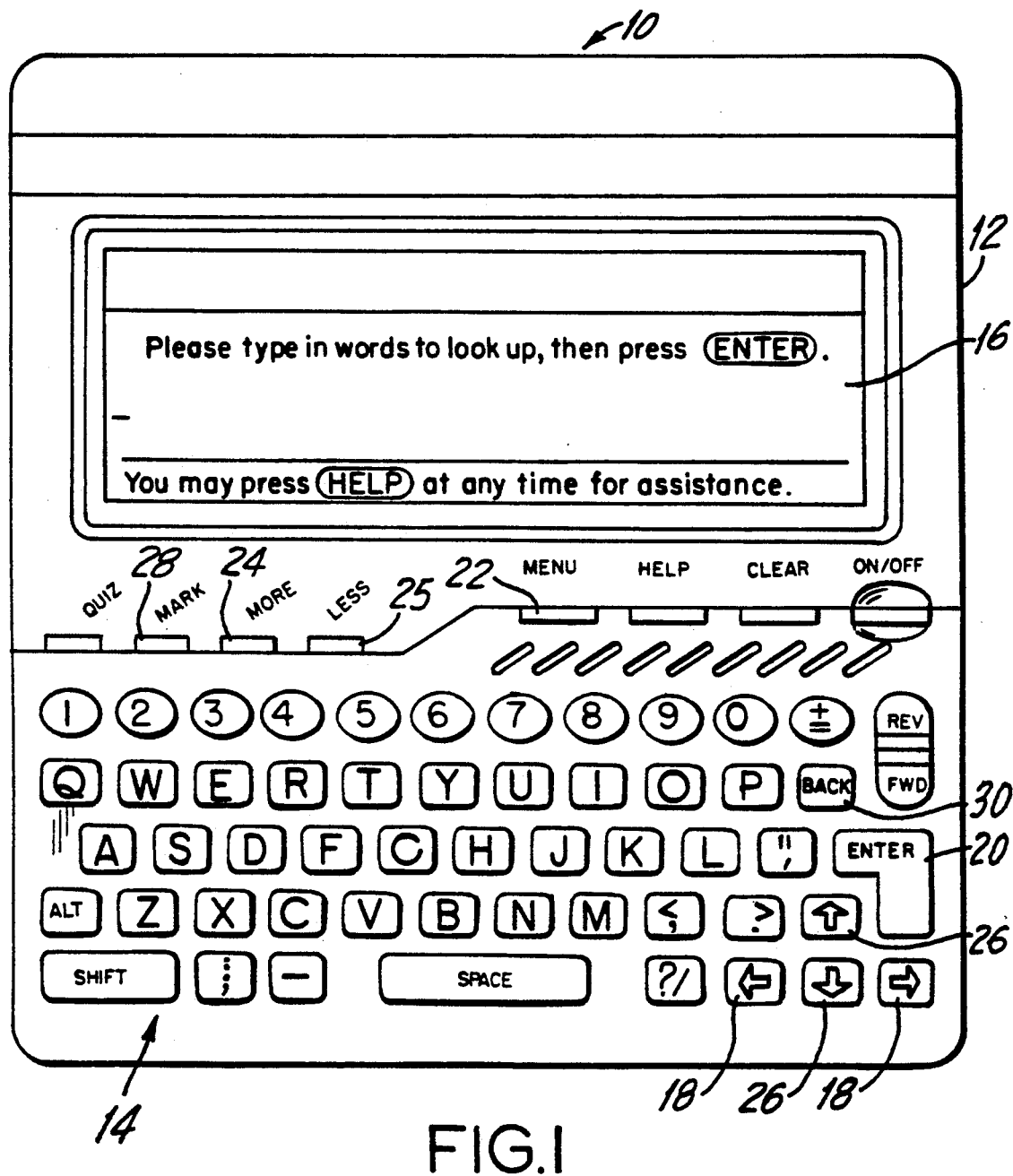
FIG. 1 is a view of the keyboard and display panel of an embodiment of this invention.

As shown in FIG. 1, the encyclopedia 10 of this invention includes a casing 12 which can be held by hand and which has a keyboard 14 on a display screen. 16. The keyboard includes scrolling keys 18 and function keys which will be described in connection with the functions of this device.

The encyclopedia information is held in ROM on a number of chips and can entail around 10,000 separate articles.

SEARCH AND SEARCH LEVEL

Figure 2:
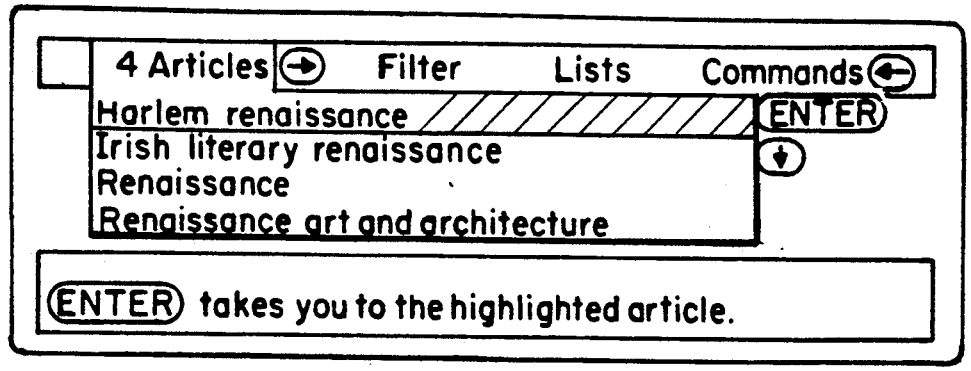
FIG. 2 illustrates the screen display that occurs after the inquiry word "Renaissance" is entered and the user then presses the Menu function key 22. This provides a list of four articles, each of which has "Renaissance" in its title.

The user enters a word or set of words of interest through the alphabetical keyboard and the Enter function key 20. For example, if the term "Renaissance" is entered, a search is made for each article which includes the term "Renaissance" as part of its title. In the embodiment, four articles are located. The titles will be shown in a screen display as indicated in FIG. 2. The first article will be "Harlem Renaissance" the second article will be "Irish literary Renaissance", the third article will be "Renaissance" and the fourth article will be "Renaissance and Architecture". If the user presses the Enter key 20, the specific article highlighted will be displayed. All of that is standard and known technology.

Figure 3:
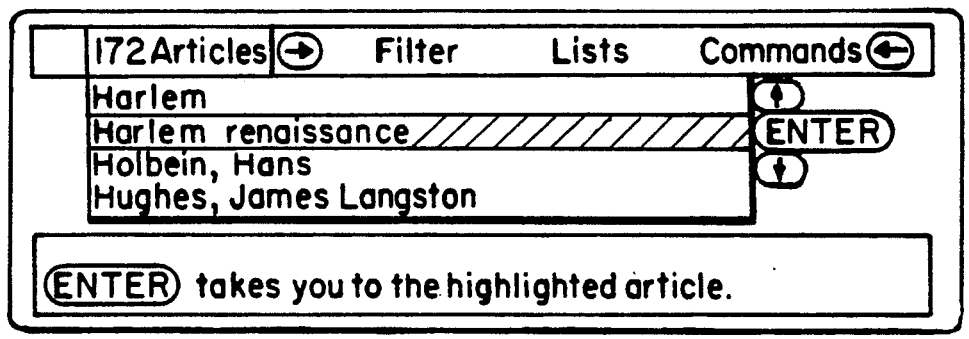
FIG. 3 illustrates the screen display that occurs subsequent to the FIG. 2 display when the user presses the More function key 24. This provides a list of 172 articles, each of which will refer to Renaissance somewhere in the title or text.

If the user wants to review in greater depth the various articles that deal with "Renaissance" or that at least mention "Renaissance" therein, the user presses the More function key 24 and obtains the screen shown in FIG. 3 which indicates that there are 172 articles in which "Renaissance" is mentioned. Because this is normally too extensive a number of articles for efficient review and reading, the filter arrangement described below permits the user to focus on the articles of greatest concern.

There are five levels of search which can provide more or fewer numbers of articles in response to a query word. At Level 0, the fewest number of articles to be found and at Level 4, the largest number of articles will be found. It is the articles found which are then screened or filtered by the process described involving the union of articles designated by parameters within a Group and the intersection of articles which are members of the Groups selected by the user. The five levels of search are as follows:

LEVEL 0: EACH query word must be found in the Article Title in its original non-inflected form.
LEVEL 1: AT LEAST ONE query word must be found in the Article Title in its original non-inflected form.
LEVEL 2: AT LEAST ONE query word must be found in the Article Title in either its original or "inflected" form.
LEVEL 3: AT LEAST one query word must be found in the Article Title in either its original or "inflected" form, or EACH query word must be found in the body of the article in its original non-inflected form.
LEVEL 4: AT LEAST ONE, query word must be found in either the Article Title or the body of the article in either its original or "inflected" form.

For each word in the query string, a list is created. Each list contains one or more threads. There is one thread for the original query word, and an additional thread for all the inflected forms of the query word. Inflected means either an inflection/unflection, or a synonym.

The search begins by automatically setting the current search level to "0". For each article that is found, the search match function is called. This function determines if the article is considered a match based on the current Search Level. If no matches are found at the current Search Level, the level is automatically incremented and the search is tried again. This continues until either a match is found, or Search Level 4 is reached, at which level a matching article will almost surely be found.

Once the automatic initial search has been completed, the More key 24 and Less key 25 can be pressed to either increment or decrement the current Search Level and perform the search again to provide more or fewer articles for further filtering as described below.

The Filtering

After the user has either accepted the automatic search level or determined the search level through use of the More key 24 and/or Less key 25, the user then presses the right scroll function key 18 to access the Filter arrangement. The result is the screen shown in FIG. 4.

Figure 4:
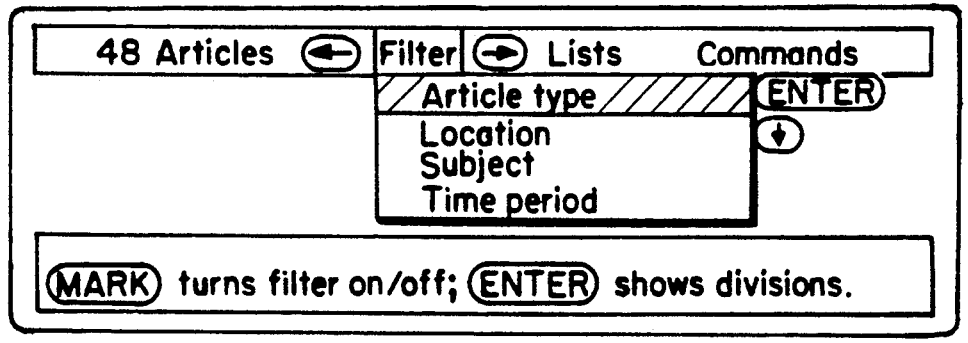
FIG. 4 illustrates the screen display that occurs after the FIG. 3 screen display when the user presses the Right Scroll function key 18 to access the four Groups into which the 107 category parameters (filters) are divided.

The meaning of the screen shown in FIG. 4 can best be understood by first appreciating that this embodiment of this invention employs 104 categorizing parameters into which all of the articles are classified. Each article is normally classified under a multiple number of these 104 classifying parameters. The classifying parameters range from certain geographical locations through certain subject matter classifications such as History and Humanities to time periods such as the Middle Ages and article types where the articles are classified into three major categories of people, places and things. By selecting one or more of these over one-hundred categories, the user can filter down the 172 relevant articles to a more manageable number.

These one-hundred plus category parameters are listed in the Filter Chart and associated lists. The filters are organized into the four Groups shown in FIG. 4. These four Groups are organizational arrangements to facilitate access to the parameter filters by the user. As indicated in the Chart, 26 filters are associated with the Location Group heading, 52 filters are associated with the Subject Group heading, 15 filters are associated with the Time Period Group heading and 11 filters are associated with the Article Type Group heading. The relationship of these 104 filters to one another within each Group differs from the relationship of these filters as between headings.

Briefly, the filters within each Group are inclusion filters so that the more filters a user selects under a given Group, the larger will be the number of articles deemed selected. That is, the number of articles classified in any one of the filters within the Location Group will be added to the number of articles classified in any other filter under the Location Group. If a given article is listed within two of the filters under the Location Group, that article will be represented only once in the union of those two filters.

By contrast, as between filters under separate Groups, the articles selected will only be those which appear in the intersection of the sets represented by the filters. For example, of the 172 articles located in the expanded "Renaissance" search, 97 will be identified by the "West Europe" filter under the Location Group and 45 articles will be identified by the "General Art" filter under the Subject Group. However, if the user selects both the "West Europe" filter and the "General Art" filter, the total number of articles will be 30. That is, the 5 articles selected will be only those which fit within both the "West Europe" parameter and the "General Art" parameter.

Figure 5:
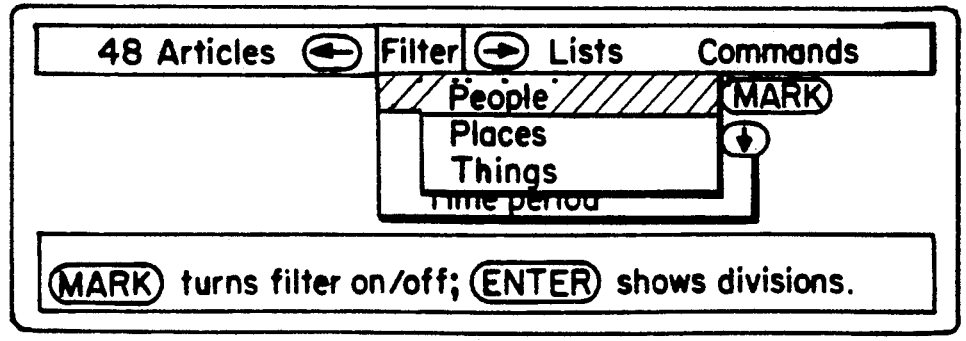
FIG. 5 illustrates the screen display that occurs after the FIG. 4 screen display when the user presses the Enter function key 20 to access the three main filter parameters into which the Article Type Group is divided.

For example, if the user presses the Enter key 20 when the FIG. 4 screen is presented, the FIG. 5 screen will be displayed. The FIG. 5 screen indicates the three main filter parameters into which the Article Type Group is divided.

More particularly, if the user presses the down Scroll key 26 while the FIG. 4 screen is presented, the Location Group becomes highlighted. The user then presses the Enter key 20 to obtain a list of filters. If the user now scrolls down with scroll key 26 to highlight the "Americas" filter and presses the Mark function key 28, the screen will show that there are eighteen articles dealing with "Renaissance" in the Americas. If the user is interested in a narrower band of articles and presses the Back function key 30 going back to the screen at FIG. 4, then scrolls to the Time Period Group, presses the Enter key 20 and scrolls through to the time period "1900-1950" and then presses the Mark key 28, the total number of articles will be shrunk to twelve. This means that there are twelve articles dealing with "Renaissance" subject matter in the Americas during the time period 1900-1950.

It might be noted that if the procedure were to first locate the Time Period filter "1900-1950" and press the Mark key 28 that would reduce the 172 articles to twenty-three and if the user then went to the "Americas" filter and hit the Mark Function key 28, that would then reduce the number of articles to twelve. In other words, only those articles which appear both under the "Americas" filter and under the "1900-1950" filter are selected by this procedure of marking those two filters. This is because those two filters are in different Groups. If the filters were under the same name Group, marking two filters would increase rather than decrease the number of articles selected.

With respect to the above example, in a preferred embodiment the various entries under the heading of Location Groups are classified under generic and species filters. In particular, the twenty-six species filters are arranged under eleven generic filters. In a number of cases, such as "Sub Saharan Africa", "Australia", "Oceans and Islands", "U.S.S.R" and "Outer Space" the specie and genus are the same. However, in other cases, seven countries in Western Europe are grouped together under the generic entry "Western Europe". In the above example, accessing the Western Europe genus and pressing the Mark key 28 will serve to select ninety-seven of the 172 articles. If the user is interested in only those articles which deal with or mention Italy, the user accesses the "Western Europe" entry, presses the Enter key 20 and obtains a listing of the seven groupings into which Western Europe is sub-divided. The user then scrolls through the listing to access the "Italy" filter parameter, presses the Mark key 28 and reduces the number of articles to forty-seven. If the user then goes back to the time period grouping and accesses "1900-1950" time period and then presses the Mark key 28, it will be found that there are no articles in that time period which mention Italy. But if the user goes back to the time period "1750-1800" one article will be accessed in this time period which relates to Italy. In the time period "1700-1750" there will be three articles. But in the time period "Renaissance" there will be thirty-four articles.

FILTER CHART

| GROUP | MAIN PARAMETERS | SECONDARY PARAMETERS |
|---|---|---|
| Article Type | People | None |
| | Places | Nine - See List A |
| | Things | None |
| Location | Americas | Latin America, Canada, USA, Other |
| | Western Europe | Seven - See List B |
| | Eastern Europe | Greece, Other |
| | USSR | None |
| | Asia | Five - See List C |
| | Middle East & North Africa | Egypt, Iran/Persia Turkey, Other |
| | Sub-Saharan Africa | None |
| | Australia | None |
| | Oceans & Islands | None |
| | Outer Space | None |
| | Other | None |
| Subject | History | Four - See List D |
| | Humanities | Thirteen - See List E |
| | Life Sciences | Eight - See List F |
| | Philosophy & Religion | Seven - See List G |
| | Physical Sciences | Eight - See List H |
| | Social Sciences | Twelve - See List I |
| Time Period | 1980's | None |
| | 1970's | None |
| | 1960's | None |
| | 1950 | None |
| | 1900-1950 | None |
| | 1850-1900 | None |
| | 1800-1950 | None |
| | 1750-1800 | None |
| | 1700-1750 | None |
| | 1650-1700 | None |
| | 1600-1650 | None |
| | Renaissance | None |
| | Middle Ages | None |
| | Early Christian Era | None |
| | Ancient Times | None |

LIST A - PLACES
Bodies of Water
Cities
Countries & Kingdoms
Islands
Man-made Constructions
Mountains
States/Provinces
Regions
Other LIST B - WESTERN EUROPE
British Isles
France
Germany
Italy
Scandinavia
Spain & Portugal
Other LIST C - ASIA
China
Indian Subcontinent
Japan
Southeast Asia
Other LIST D - HISTORY
Military History
General History
Royalty/World Leaders
Other Leaders -continued

| FILTER CHART |
|---|
| LIST E - HUMANITIES |
| Architecture |
| Arts & Crafts |
| Dance |
| Entertainment |
| Games & Sports |
| General Art |
| Geography |
| Journalism |
| Linguistics |
| Literature |
| Music |
| Mythology |
| Other |
| LIST F - LIFE SCIENCES |
| Agriculture/Horticulture |
| Biology |
| Botany |
| Environment |
| Medicine |
| Health & Nutrition |
| Zoology |
| Other |
| LIST G - PHILOSOPHY AND RELIGION |
| Bible |
| Christianity |
| Eastern Religions |
| Islam |
| Judaism & Jewish Culture |
| Philosophy |
| General & Other Religions |
| LIST H - PHYSICAL SCIENCES |
| Astronomy & Aeronautics |
| Chemistry & Materials |
| Engineering |
| High Technology |
| Earth Science |
| Mathematics |
| Physics |
| Other Physical Sciences |
| LIST I - SOCIAL SCIENCES |
| Anthropology/Archeology |
| Black Studies |
| Business |
| Economics |
| Education |
| Law |
| Mental Health |
| Military Science |
| Politics |
| Sociology |
| Women's Studies |
| Other |

What is claimed is:

1. An electronic encyclopedia having subject matter search capability with a keyboard and a display screen for presenting text articles relevant to a user entered search term comprising:
   a set of N filter parameters,
   each text article in the encyclopedia being identified by at least one of said N filter parameters,
   said N filter parameters being classified into M Groups,
   user actuated first keyboard means adapted to permit a user to select a plurality of said M Groups,
   user actuated second keyboard means adapted to permit a user to select a plurality of said N filter parameters within each of the selected ones of said M Groups,
   all members of a user selected set of filter parameters that are within a single Group constituting a Group subset, filter parameters within each Group subset automatically acting additively to provide the union of the text articles identified by each selected filter parameter within the Group,
   the subset of selected filter parameters of any of said Groups automatically acting with the subset of selected filter parameters of any other of said groups to provide only the text articles which are common to said subsets,
   whereby selection of additional filter parameters with a Group tends to increase the number of text articles selected and selection of filter parameters from multiple Groups tends to decrease the number of text articles selected.

2. The electronic encyclopedia of claim 2 wherein:
   said user actuated second keyboard means is operative only after one of said M Groups is selected by said first keyboard means.

3. The electronic encyclopedia of claim 1 wherein said first and second user actuated means comprises:
   a first user actuated key to access said M Groups,
   a second user actuated key to select one of said M Groups,
   a third user actuated key to access the set of filters within said selected one of said Groups,
   a fourth user actuated key to select one or more of said filter parameters within said selected one of said Groups, and
   a fifth user actuated key to re-access said M Groups.

4. The electronic encyclopedia improvement of claim 1 wherein:
   within at least one of said Groups, said filter parameter are arranged hierarchically, predetermined subsets of said filters being subsumed under generic filter parameters, and
   said user actuated second keyboard means including user actuated means to select a generic filter parameter thereby selecting all of the filters subsumed by said generic filter parameter.

5. The electronic encyclopedia of claim 4 wherein said first and second user actuated means comprises:
   a first user actuated key to access said M Groups,
   a second user actuated key to select one of said M Groups,
   a third user actuated key to access the set of filters within said selected one of said Groups,
   a fourth user actuated key to select one or more of said filter parameters within said selected one of said Groups, and
   a fifth user actuated key to re-access said M Groups.

6. The electronic encyclopedia of claim 1 further comprising:
   a first matching means to provide a match with any article wherein each component of said search term is found in the article title in identical form to provide a first level search list of relevant articles,
   a second matching means to provide a match with any article wherein any one component of said search term is found in the article title in its original form to provide a second level search list of relevant articles,
   a third matching means to provide a match with any articles wherein at least one component of said search term in either its original or inflected form is found in the article title to provide a third level search list of relevant articles,
   a fourth matching means to provide a match with any article wherein either (i) at least one component of said search term in either its original form or inflected form is found in the article title or (ii) each component of said search term is found in the body of the article in its original form, to provide a fourth level search list of relevant articles, and a fifth matching means to provide a match with any article wherein at least one component of said search term is found in either its original form or inflected form in either the article title or the body of the article to provide a fifth level search list of relevant articles.

7. The electronic encyclopedia improvement of claim 6 further comprising:

a first user actuated key to initiate search of matching article titles.

cycling means for automatically cycling through a sequence starting with said first matching means and proceeding to said fifth matching means until at least one article has been located by one of said matching means, and a user actuated second key to permit the user to advance the search level from the search level at which articles are first found by said automatic cycling means to higher level search matching means.

8. The electronic encyclopedia of claim 7 wherein: said user actuated second keyboard means is operative only after one of said M Groups is selected by said first keyboard means.

9. The electronic encyclopedia of claim 7 wherein said first and second user actuated means comprises:

a first user actuated key to access said M Groups, a second user actuated key to select one of said M Groups, a third user actuated key to access the set of filters within said selected one of said Groups, a fourth user actuated key to select one or more of said filter parameters within said selected one of said Groups, and a fifth user actuated key to re-access said M Groups.

10. The electronic encyclopedia improvement of claim 9 wherein:

within at least one of said Groups, said filter parameter are arranged hierarchically, predetermined subsets of said filters being subsumed under generic filter parameters, and said user actuated second keyboard means including user actuated means to select a generic filter parameter thereby selecting all of the filters subsumed by said generic filter parameter.

* * * * *